United States Patent
Yang

(10) Patent No.: US 12,028,825 B2
(45) Date of Patent: Jul. 2, 2024

(54) NETWORK DETACH METHODS AND APPARATUSES

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 416 days.

(21) Appl. No.: 17/599,435

(22) PCT Filed: Apr. 1, 2019

(86) PCT No.: PCT/CN2019/080825
§ 371 (c)(1),
(2) Date: Sep. 28, 2021

(87) PCT Pub. No.: WO2020/199080
PCT Pub. Date: Oct. 8, 2020

(65) Prior Publication Data
US 2022/0201643 A1     Jun. 23, 2022

(51) Int. Cl.
H04W 60/06       (2009.01)
H04W 76/20       (2018.01)
H04W 76/30       (2018.01)

(52) U.S. Cl.
CPC ........... *H04W 60/06* (2013.01); *H04W 76/20* (2018.02); *H04W 76/30* (2018.02)

(58) Field of Classification Search
CPC ...... H04W 60/06; H04W 76/20; H04W 76/30
USPC ........................................................ 370/329
See application file for complete search history.

(56) References Cited

U.S. PATENT DOCUMENTS

| 10,237,780 B2 | 3/2019 | Kumar et al. | |
| 2008/0031159 A1* | 2/2008 | Jokinen | H04W 36/0033 370/255 |
| 2009/0061878 A1* | 3/2009 | Fischer | H04W 36/0094 455/436 |
| 2009/0190554 A1* | 7/2009 | Cho | H04W 36/38 370/331 |

(Continued)

FOREIGN PATENT DOCUMENTS

| CN | 101754311 A | 6/2010 |
| CN | 106060793 A | 10/2016 |

(Continued)

OTHER PUBLICATIONS

International Search Report Issued in Application No. PCT/CN2019/080825, Jan. 10, 2020 with English translation, (4p).

(Continued)

*Primary Examiner* — Mark G. Pannell
(74) *Attorney, Agent, or Firm* — Arch & Lake LLP

(57) ABSTRACT

A network detach method, including: determining that a connection between the terminal and a target base station is successfully established; setting a detach indication, wherein the detach indication is used to instruct the terminal to detach from a source base station; and sending the detach indication to the target base station, wherein the detach indication is forwarded by the target base station to the source base station, so that the source base station performs network detach from the terminal based on the detach indication.

16 Claims, 8 Drawing Sheets

(56) References Cited

U.S. PATENT DOCUMENTS

| | | | |
|---|---|---|---|
| 2010/0027497 A1* | 2/2010 | Pelletier | H04W 28/06 370/329 |
| 2010/0135249 A1* | 6/2010 | Meyer | H04W 36/02 370/331 |
| 2010/0189074 A1* | 7/2010 | Liao | H04W 36/0011 370/331 |
| 2010/0330999 A1* | 12/2010 | Larsson | H04W 36/08 455/439 |
| 2011/0269469 A1* | 11/2011 | Xiao | H04W 36/0072 455/436 |
| 2012/0282964 A1* | 11/2012 | Xiao | H04L 5/0053 455/515 |
| 2013/0115949 A1* | 5/2013 | Centonza | H04W 36/245 455/436 |
| 2015/0038145 A1* | 2/2015 | Nakata | H04W 36/0055 455/436 |
| 2015/0181481 A1* | 6/2015 | Masini | H04W 36/0085 455/436 |
| 2015/0249972 A1* | 9/2015 | You | H04L 5/0053 370/254 |
| 2015/0264621 A1* | 9/2015 | Sivanesan | H04W 36/0069 455/436 |
| 2015/0282033 A1* | 10/2015 | Lunden | H04W 36/0079 455/436 |
| 2016/0044576 A1* | 2/2016 | Hahn | H04W 16/08 455/434 |
| 2016/0135072 A1* | 5/2016 | Wang | H04W 40/24 370/237 |
| 2016/0295451 A1 | 10/2016 | Kumar et al. | |
| 2016/0353337 A1* | 12/2016 | Zhu | H04W 36/00837 |
| 2017/0094495 A1* | 3/2017 | Ke | H04W 4/023 |
| 2017/0290054 A1* | 10/2017 | Zhao | H04W 74/02 |
| 2018/0132158 A1* | 5/2018 | Tseng | H04W 76/27 |
| 2018/0192335 A1* | 7/2018 | Bontu | H04W 74/0833 |
| 2018/0270717 A1* | 9/2018 | Kakishima | H04W 24/10 |
| 2019/0098684 A1* | 3/2019 | Tamura | H04W 88/10 |
| 2019/0104452 A1* | 4/2019 | Park | H04W 36/0085 |
| 2019/0182706 A1 | 6/2019 | Kumar et al. | |
| 2019/0253945 A1* | 8/2019 | Paladugu | H04W 76/27 |
| 2019/0268815 A1* | 8/2019 | Zhu | H04W 36/0033 |
| 2020/0137639 A1* | 4/2020 | Yuan | H04W 36/0011 |
| 2020/0296635 A1* | 9/2020 | Rastegardoost | H04W 72/23 |
| 2020/0314716 A1* | 10/2020 | Kim | H04W 36/0079 |
| 2020/0396655 A1* | 12/2020 | Wu | H04W 56/001 |
| 2021/0051537 A1* | 2/2021 | Zhang | H04W 36/36 |
| 2021/0076266 A1* | 3/2021 | Wu | H04W 36/0005 |
| 2021/0345213 A1* | 11/2021 | Kim | H04W 36/0058 |
| 2022/0141733 A1* | 5/2022 | Xu | H04W 36/08 370/331 |
| 2022/0191752 A1* | 6/2022 | Rune | H04W 36/245 |

FOREIGN PATENT DOCUMENTS

| | | |
|---|---|---|
| CN | 107347199 A | 11/2017 |
| EP | 2563071 A1 | 2/2013 |
| GB | 2250891 B | 5/1995 |
| WO | 2009139675 A1 | 11/2009 |

OTHER PUBLICATIONS

State Intellectual Property Office of the People's Republic of China, Office Action and Search Report Issued in Application No. 201980000573.5, Jun. 24, 2021, with English Machine Translation, (12p).

Huawei, HiSilicon; "Considerations on detaching aspect",3GPP TSG-RAN WG2 Meeting #105bis, R2-1903917, Xi'an, China, Apr. 8-12, 2019, (4p).

Mediatek Inc.; "Source Cell Detaching for Minimizing User Data Interruption during HO", 3GPP TSG RAN WG2, R2-1903256, Meeting #105bis, Xi'an, China, Apr. 8-12, 2019, (6p).

* cited by examiner

NETWORK DETACH METHODS AND APPARATUSES

CROSS REFERENCE TO RELATED APPLICATIONS

The present application is a national stage of International Application No. PCT/CN2019/080825 filed on Apr. 1, 2019, the disclosure of which is hereby incorporated by reference in its entirety.

TECHNICAL FIELD

The present disclosure relates to the field of communication technology, and in particular to network detach methods and apparatuses.

BACKGROUND

With continuous development of communication technology, there are more and more expectations for a short service interruption time of a terminal in a cell handover process.

In the fourth generation mobile communication technology (4th Generation, referred to as 4G), in order to shorten the service interruption time of the terminal in the handover process, Make-Before-Break (MBB for short) technology is introduced. After receiving a cell handover command sent from a source base station, the terminal may continue to maintain a connection with the source base station for data sending and reception; after initiating a synchronization process with a target base station, the terminal may detach from the source base station.

In the fifth generation mobile communication technology (5th Generation, referred to as 5G), in order to further shorten the service interruption time of the terminal in the handover process, the terminal may continue to maintain the connection with the source base station after initiating the synchronization process with the target base station. In addition, when detaching from the source base station, the terminal may send a detach indication to the source base station.

However, it takes a certain time for the terminal to establish a connection with the target base station, and channel quality between the terminal and the source base station can deteriorate rapidly in the handover process, such that the terminal possibly cannot successfully send the detach indication to the source base station. This may cause the source base station to delay sending a next available sequence number and to-be-sent data (i.e., delay sequence number transfer and data forwarding) to the target base station, thereby causing additional interruption time.

SUMMARY

In order to overcome the problems, the embodiments of the present disclosure provide network detach methods and apparatuses.

According to a first aspect of the present disclosure, there is provided a network detach method applied to a terminal, including:
- determining that a connection between the terminal and a target base station is successfully established;
- setting a detach indication, where the detach indication is used to instruct the terminal to detach from a source base station; and
- sending the detach indication to the target base station, where the detach indication is forwarded by the target base station to the source base station, so that the source base station performs network detach from the terminal based on the detach indication.

According to a second aspect of the present disclosure, there is provided a network detach method applied to a target base station, including:
- receiving a detach indication sent from a terminal, where the detach indication is used to instruct the terminal to detach from a source base station; and
- forwarding the detach indication to the source base station, so that the source base station performs network detach from the terminal based on the detach indication.

According to a third aspect of the present disclosure, there is provided a network detach method applied to a source base station, including:
- receiving a detach indication of a terminal forwarded by a target base station, where the detach indication is indication information set after the terminal successfully establishes a connection with the target base station and used to instruct the terminal to detach from the source base station; and
- performing network detach from the terminal based on the detach indication.

According to a fourth aspect of the present disclosure, there is provided a non-transitory computer readable storage medium with computer instructions stored thereon, where the computer instructions are used to perform the network detach method according to the first aspect.

According to a fifth aspect of the present disclosure, there is provided a non-transitory computer readable storage medium with computer instructions stored thereon, where the computer instructions are used to perform the network detach method according to the second aspect.

According to a sixth aspect of the present disclosure, there is provided a non-transitory computer readable storage medium with computer instructions stored thereon, where the computer instructions are used to perform the network detach method according to the third aspect.

According to a seventh aspect of the present disclosure, there is provided a network detach apparatus applied to a terminal, including:
- a processor; and
- a memory for storing instructions executable by the processor,
- where the processor is configured to:
- determine that a connection between the terminal and a target base station is successfully established;
- set a detach indication, where the detach indication is used to instruct the terminal to detach from a source base station; and
- send the detach indication to the target base station, where the detach indication is forwarded by the target base station to the source base station, so that the source base station performs network detach from the terminal based on the detach indication.

According to an eighth aspect of the present disclosure, there is provided a network detach apparatus applied to a target base station, including:
- a processor; and
- a memory for storing instructions executable by the processor,
- where the processor is configured to:
- receive a detach indication sent from a terminal, where the detach indication is used to instruct the terminal to detach from a source base station; and forward the detach indication to the source base station, so that the source base station performs network detach from the terminal based on the detach indication.

According to a ninth aspect of the present disclosure, there is provided a network detach apparatus applied to a source base station, including:

a processor; and a memory for storing instructions executable by the processor, where the processor is configured to:

receive a detach indication of a terminal forwarded by a target base station, where the detach indication is indication information set after the terminal successfully establishes a connection with the target base station and used to instruct the terminal to detach from the source base station; and perform network detach from the terminal based on the detach indication.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
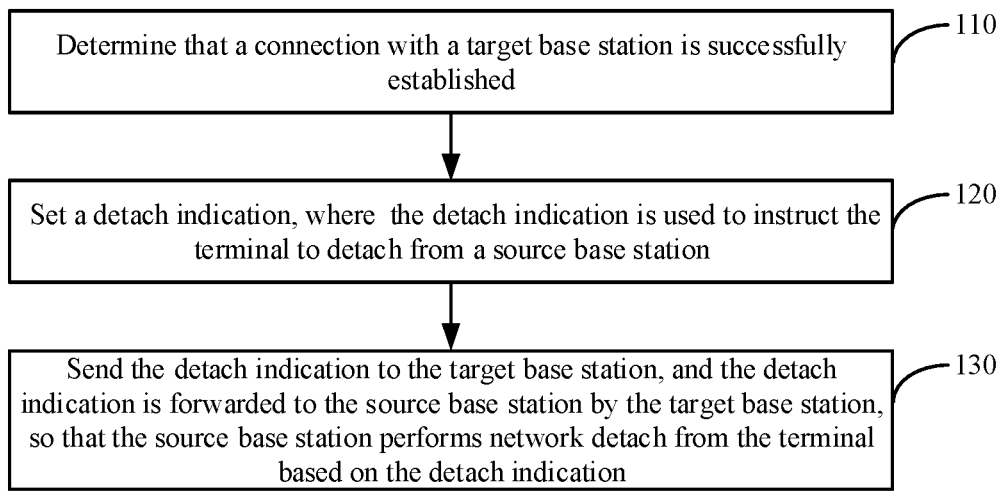
FIG. 1 is a flowchart illustrating a network detach method according to an embodiment.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure.

The terms used in the present disclosure are only for the purpose of describing specific examples and are not intended to limit the present disclosure. The singular forms "a", "said" and "the" used in the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms "first", "second", "third", etc. may be used in the present disclosure to describe various information, the information should not be limited to these terms. These terms are only used to distinguish information of the same type from each other. For example, without departing from the scope of the present disclosure, the first information may also be referred to as second information, and similarly, the second information may also be referred to as first information. Depending on the context, the word "if" as used herein may be interpreted as "on the condition that" or "when" or "in response to determining".

Figure 2:
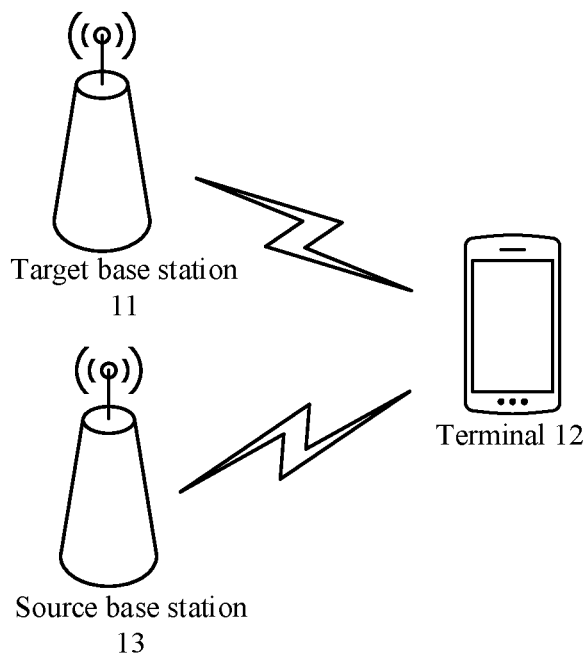
FIG. 2 is an application scenario diagram illustrating a network detach method according to an embodiment.

FIG. 1 is a flowchart of a network detach method according to an embodiment, and FIG. 2 is an application scenario diagram of a network detach method according to an embodiment; the network detach method can be applied to a terminal, as shown in FIG. 1, the network detach method may include following steps 110 to 130.

At step 110, it is determined that a connection with a target base station is successfully established.

At step 120, a detach indication is set, where the detach indication is used to instruct the terminal to detach from a source base station.

In the embodiments of the present disclosure, after determining that the connection with the target base station is successfully established, the terminal can set a detach indication, and send the detach indication to the source base station through the target base station.

In an embodiment, the detach indication in the step 120 may include a source cell identifier. The source cell identifier is used by the target base station to find a corresponding source base station based on the source cell identifier.

In an embodiment, the detach indication in the step 120 may be a bit or a subframe number.

At step 130, the detach indication is sent to the target base station, and the detach indication is forwarded to the source base station by the target base station, so that the source base station performs network detach from the terminal based on the detach indication.

In an exemplary scenario, as shown in FIG. 2, a target base station 11, a terminal (or terminals) 12, and a source base station 13 are included. The target base station 11 may be a 4G base station or a 5G base station; the source base station 13 may be a 4G base station or a 5G base station. After determining that the connection with the target base station 11 is successfully established, the terminal 12 can set a detach indication used to instruct the terminal 12 to detach from the source base station 13, and send the detach indication to the target base station 11, and the detach indication is forwarded to the source base station 13 by the target base station 11, so that the source base station 13 can perform network detach from the terminal 12 based on the detach indication.

In the present disclosure, the target base station 11 or the source base station 13 may be an apparatus deployed in an access network to provide wireless communication functionalities for the terminal 12. The target base station 11 or the source base station 13 may include various types of macro base stations, micro base stations, relay stations, access points, and so on. In systems adopting different radio access technologies, names of devices having functionalities of a base station may be different. For example, in 5G NR systems, they are called gNodeB or gNB. As communication technology evolves, the name "base station" may change. For the convenience of description, in the embodiments of the present disclosure, apparatuses for providing wireless communication functionalities for the terminal 12 are collectively referred to as base stations.

Usually, there are a plurality of terminals 12, and one or more terminals 12 may be distributed in a cell managed by the target base station 11 or the source base station 13. The terminals 12 may include various devices with wireless communication functionalities such as handheld devices, vehicle-mounted devices, wearable devices, computing devices or other processing devices connected to a wireless modem, as well as various types of User Equipment (UE for short), Mobile Station (MS for short), terminal device, etc. For ease of description, in the embodiments of the present disclosure, the above-mentioned devices are collectively referred to as terminals.

It can be seen from the above embodiment that after it is determined that the connection between the terminal and the target base station is successfully established, a detach indication can be set. The detach indication is used to instruct the terminal to detach from the source base station. The detach indication is sent to the target base station, and is forwarded to the source base station by the target base station, so that the source base station may perform network detach from the terminal based on the detach indication. In this way, a service interruption caused by a failure to send the detach indication from the terminal to the source base station is avoided, service interruption time of the terminal during a handover process is further shortened and the accuracy and efficiency of network detach are also improved.

Figure 3:
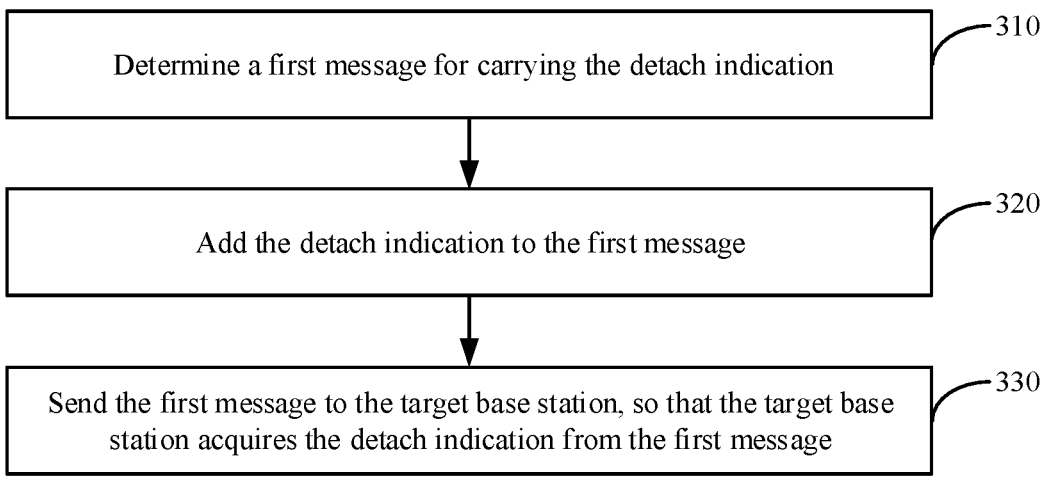
FIG. 3 is a flowchart illustrating another network detach method according to an embodiment.

FIG. 3 is a flowchart illustrating another network detach method according to an embodiment. The network detach method can be applied to a terminal. On the basis of the method shown in FIG. 1, as shown in FIG. 3, the step 130, when performed, may include the following steps 310 to 330.

At step 310, a first message for carrying the detach indication is determined.

In the embodiments of the present disclosure, the terminal can determine the first message for carrying the detach indication according to actual conditions.

In an embodiment, the first message in the step 310 may include, but is not limited to, a Radio Resource Control (RRC for short) reconfiguration complete message and/or a terminal assistance information message.

At step 320, the detach indication is added to the first message.

In the embodiments of the present disclosure, the detach indication may be sent from the terminal to the target base station through the first message.

At step 330, the first message is sent to the target base station, so that the target base station acquires the detach indication from the first message.

For example, the first message is the RRC reconfiguration complete message.

Taking the exemplary scenario of FIG. 2 as an example, the network detach process may include the following actions: (1) the terminal 12 sends the RRC reconfiguration complete message to the target base station 11 and stops data sending and reception to or from the base station 13 at the same time, where the RRC reconfiguration complete message carries a source cell identifier and a one-bit detach indication; (2) after receiving the RRC reconfiguration complete message, the target base station 11 may forward the detach indication to the source base station 13 corresponding to the source cell identifier; (3) after receiving the detach indication, the source base station 13 stops sending data to the terminal 12 and receiving data from the terminal 12, and at the same time sends a next available sequence number and to-be-sent data (i.e., performing sequence number transfer and data forwarding) to the target base station; and (4) the target base station 11 starts to send data to the terminal 12 and receive data from the terminal 12.

For another example, the first message is the terminal assistance information message.

Taking the exemplary scenario of FIG. 2 as an example, the network detach process may include the following actions: (1) the terminal 12 sends the terminal assistance information message to the target base station 11, where the terminal assistance information message carries the source cell identifier and the detach indication, and the detach indication indicates subframe 5. The terminal stops data sending and reception to or from the base station 13 at subframe 5; (2) after receiving the terminal assistance information message, the target base station 11 may forward the detach indication to the source base station 13 corresponding to the source cell identifier; (3) after receiving the detach indication, the source base station 13 stops sending data to the terminal 12 and receiving data from the terminal 12 at subframe 5, and at the same time sends a next available sequence number and to-be-sent data (i.e., performing sequence number transfer and data forwarding) to the target base station; and (4) the target base station 11 starts to send data to the terminal 12 and receive data from the terminal 12.

It can be seen from the above embodiment that the first message can be sent to the target base station, for example, through the RRC reconfiguration complete message and/or the terminal assistance information message, so that the target base station acquires the detach indication from the first message, thereby improving the reliability of detach indication transmission.

Figure 4:
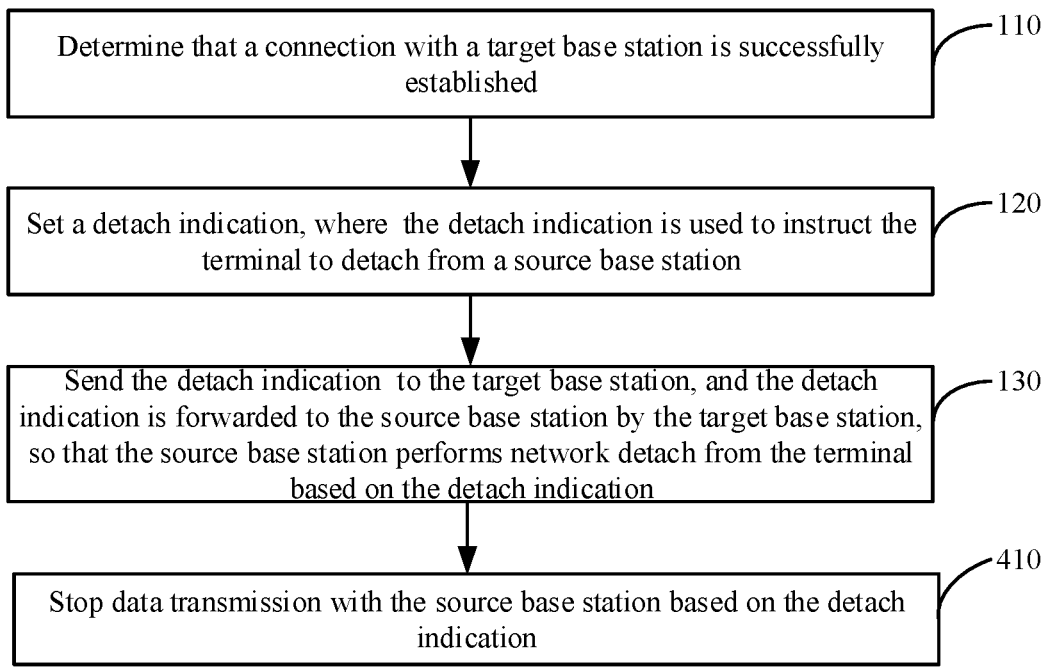
FIG. 4 is a flowchart illustrating another network detach method according to an embodiment.

FIG. 4 is a flowchart illustrating another network detach method according to an embodiment. The network detach method can be applied to a terminal. On the basis of the method shown in FIG. 1, as shown in FIG. 4, the network detach method may include the following step 410.

At step 410, data transmission with the source base station is stopped based on the detach indication.

In the embodiments of the present disclosure, after sending the detach indication to the target base station, the terminal can stop data sending and reception to or from the source base station based on the detach indication.

In an embodiment, if the detach indication includes a first subframe number, when performing the step 410, the terminal may stop data transmission with the source base station when it reaches a subframe indicated by the first subframe number.

For example, if the first subframe number indicates subframe 5, the terminal may stop data sending and reception to or from the source base station at subframe 5.

It can be seen from the above embodiment that after the detach indication is sent to the target base station, data transmission between the terminal and the source base station can be stopped based on the detach indication, thereby improving the utility of network detach.

Figure 5:
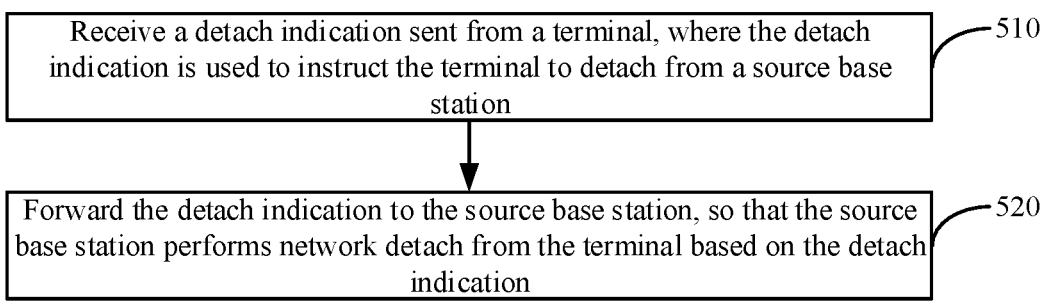
FIG. 5 is a flowchart illustrating a network detach method according to an embodiment.

FIG. 5 is a flowchart illustrating another network detach method according to an embodiment. The network detach method may be applied to a target base station. As shown in FIG. 5, the network detach method may include following steps 510 and 520.

At step 510, a detach indication sent from a terminal is received, where the detach indication is used to instruct the terminal to detach from a source base station.

In an embodiment, since the detach indication may be sent from the terminal to the target base station through a first message for carrying the detach indication, the step 510, when performed by the target base station, may include the following actions:
(1-1) receiving the first message for carrying the detach indication sent from the terminal; and
(1-2) acquiring the detach indication from the first message.

In an embodiment, the first message in (1-1) above may include, but is not limited to, a Radio Resource Control (RRC) reconfiguration complete message and/or a terminal assistance information message.

At step 520, the detach indication is forwarded to the source base station, so that the source base station performs network detach from the terminal based on the detach indication.

In an embodiment, if the detach indication of the terminal includes a source cell identifier, the step 520, when performed by the target base station, may include the following actions:
(2-1) determining the source base station corresponding to the source cell identifier; and
(2-2) forwarding the detach indication to the source base station corresponding to the source cell identifier.

It can be seen from the above embodiment that the detach indication sent from the terminal is received, the detach indication is used to instruct the terminal to detach from the source base station, and the detach indication is forwarded to the source base station. In this way, the source base station can perform network detach from the terminal based on the detach indication forwarded by the target base station, thus enriching the implementation of the detach indication, and also improving the reliability of the detach indication transmission.

Figure 6:
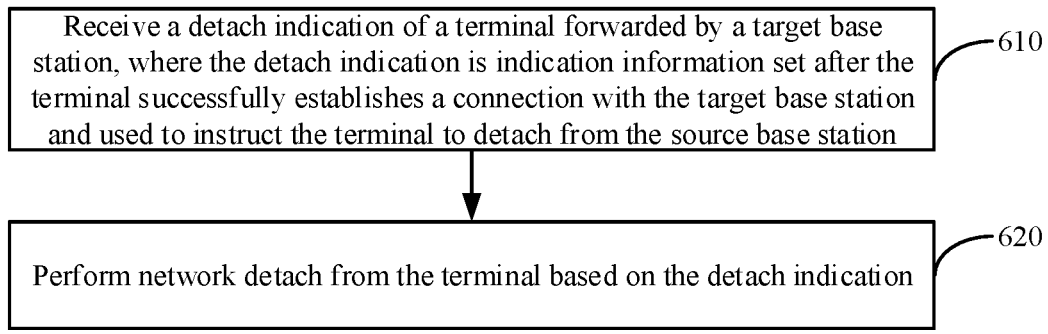
FIG. 6 is a flowchart illustrating a network detach method according to an embodiment.

FIG. 6 is a flowchart illustrating another network detach method according to an embodiment. The network detach method may be applied to a source base station. As shown in FIG. 6, the network detach method may include the following steps 610 and 620.

At step 610, a detach indication of a terminal forwarded by a target base station is received. The detach indication is indication information set after the terminal successfully establishes a connection with the target base station and used to instruct the terminal to detach from the source base station.

At step 620, the network detach from the terminal is performed based on the detach indication.

In an embodiment, the step 610, when performed by the source base station, may include the following actions:
(3-1) stopping data transmission with the terminal based on the detach indication; and
(3-2) sending a next available sequence number and to-be-sent data (i.e., performing sequence number transfer and data forwarding) to the target base station.

In an embodiment, if the detach indication includes a first subframe number, the source base station, when performing the step 510, may stop data transmission with the terminal when it reaches a subframe indicated by the first subframe number.

For example, if the first subframe number indicates subframe 5, the source base station may stop data sending and reception to or from the terminal at subframe 5.

It can be seen from the above embodiment that the detach indication of the terminal forwarded by the target base station is received. The detach indication is indication information set after the terminal successfully establishes a connection with the target base station and used to instruct the terminal to detach from the source base station. The network detach from the terminal is performed based on the detach indication forwarded by the target base station. In this way, a service interruption caused by a failure to send the detach indication from the terminal to the source base station is avoided, service interruption time of the terminal during a handover process is further shortened and the accuracy and efficiency of network detach are also improved.

Corresponding to the above-mentioned network detach method embodiments, the present disclosure also provides network detach apparatus embodiments.

Figure 7:
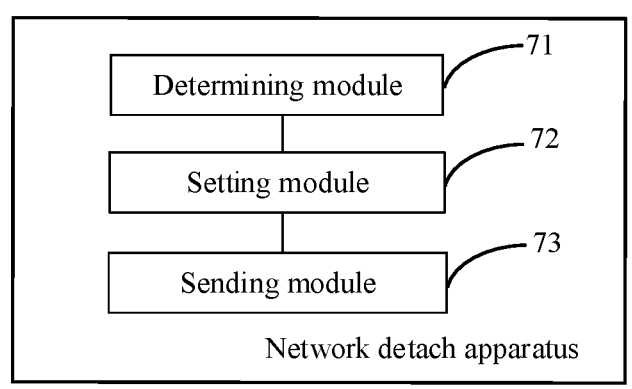
FIG. 7 is a block diagram illustrating a network detach apparatus according to an embodiment.

FIG. 7 is a block diagram illustrating a network detach apparatus according to an embodiment. The network detach apparatus may be applied to a terminal and used to perform the network detach method shown in FIG. 1. As shown in FIG. 7, the network detach apparatus can include:
a determining module 71, configured to determine that a connection between the terminal and a target base station is successfully established;
a setting module 72, configured to set a detach indication, where the detach indication is used to instruct the terminal to detach from a source base station; and
a sending module 73, configured to send the detach indication to the target base station, where the detach indication is forwarded by the target base station to the source base station, so that the source base station performs network detach from the terminal based on the detach indication.

It can be seen from the above embodiment that after it is determined that the connection between the terminal and the target base station is successfully established, a detach indication can be set. The detach indication is used to instruct the terminal to detach from the source base station. The detach indication is sent to the target base station, and is forwarded to the source base station by the target base station, so that the source base station may perform network detach from the terminal based on the detach indication. In this way, a service interruption caused by a failure to send the detach indication from the terminal to the source base station is avoided, service interruption time of the terminal during a handover process is further shortened and the accuracy and efficiency of network detach are also improved.

In an embodiment, on the basis of the apparatus shown in FIG. 7, the detach indication includes a source cell identifier.

In an embodiment, on the basis of the apparatus shown in FIG. 7, the detach indication is a bit or a subframe number.

Figure 8:
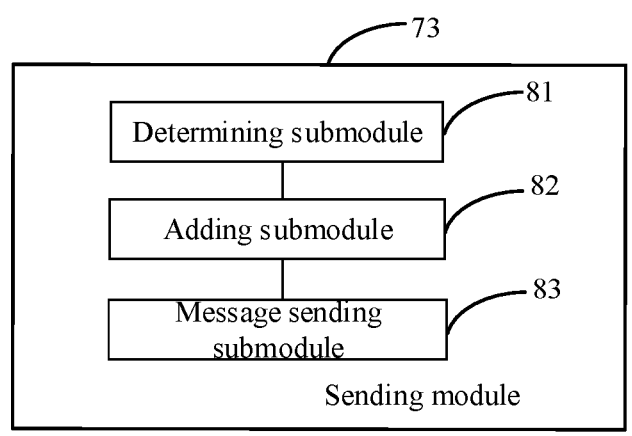
FIG. 8 is a block diagram illustrating another network detach apparatus according to an embodiment.

In an embodiment, on the basis of the apparatus shown in FIG. 7, as shown in FIG. 8, the sending module 73 may include:
- a determining submodule 81, configured to determine a first message for carrying the detach indication;
- an adding submodule 82, configured to add the detach indication to the first message; and
- a message sending submodule 83, configured to send the first message to the target base station, so that the target base station acquires the detach indication from the first message.

In an embodiment, on the basis of the apparatus shown in FIG. 8, the first message includes at least one of a Radio Resource Control (RRC) reconfiguration complete message or a terminal assistance information message.

It can be seen from the above embodiment that the first message can be sent to the target base station, for example, through the RRC reconfiguration complete message and/or the terminal assistance information message, so that the target base station acquires the detach indication from the first message, thereby improving the reliability of detach indication transmission.

Figure 9:
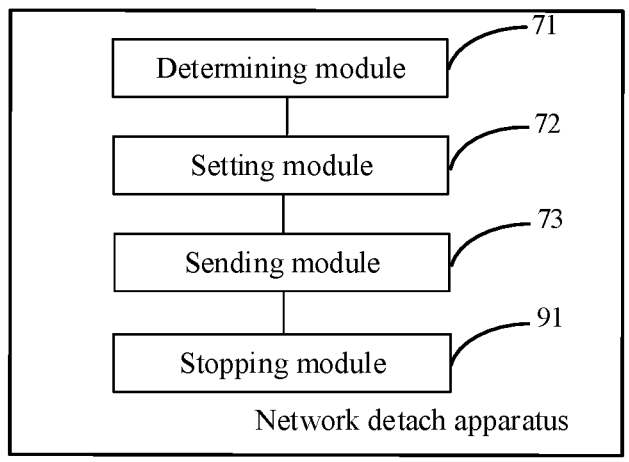
FIG. 9 is a block diagram illustrating another network detach apparatus according to an embodiment.

In an embodiment, on the basis of the apparatus shown in FIG. 7, as shown in FIG. 9, the apparatus may further include:
- a stopping module 91, configured to stop data transmission with the source base station based on the detach indication.

Figure 10:
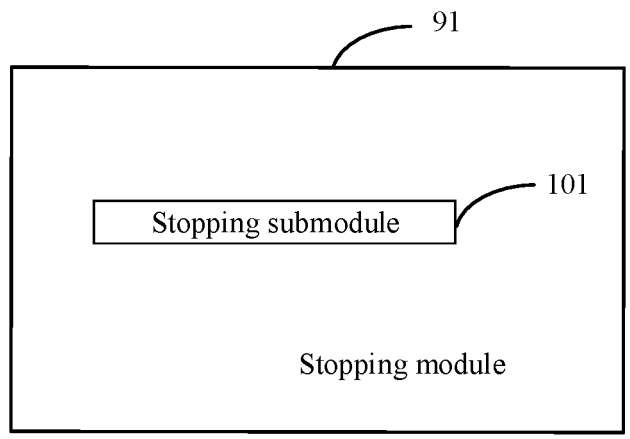
FIG. 10 is a block diagram illustrating another network detach apparatus according to an embodiment.

In an embodiment, on the basis of the apparatus shown in FIG. 9, as shown in FIG. 10, the detach indication includes a first subframe number; the stopping module 91 may include:
- a stopping submodule 101, configured to stop data transmission with the source base station when reaching a subframe indicated by the first subframe number.

It can be seen from the above embodiment that after the detach indication is sent to the target base station, data transmission between the terminal and the source base station can be stopped based on the detach indication, thereby improving the utility of network detach.

Figure 11:
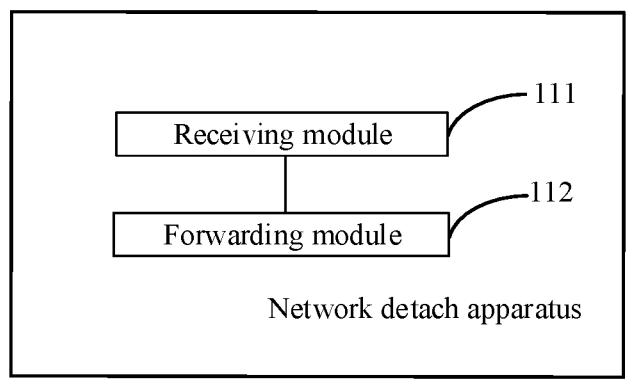
FIG. 11 is a block diagram illustrating a network detach apparatus according to an embodiment.

FIG. 11 is a block diagram illustrating a network detach apparatus according to an embodiment. The network detach apparatus may be applied to a target base station and used to perform the network detach method shown in FIG. 5. As shown in FIG. 11, the network detach apparatus can include:
- a receiving module 111, configured to receive a detach indication sent from a terminal, where the detach indication is used to instruct the terminal to detach from a source base station; and
- a forwarding module 112, configured to forward the detach indication to the source base station, so that the source base station performs network detach from the terminal based on the detach indication.

Figure 12:
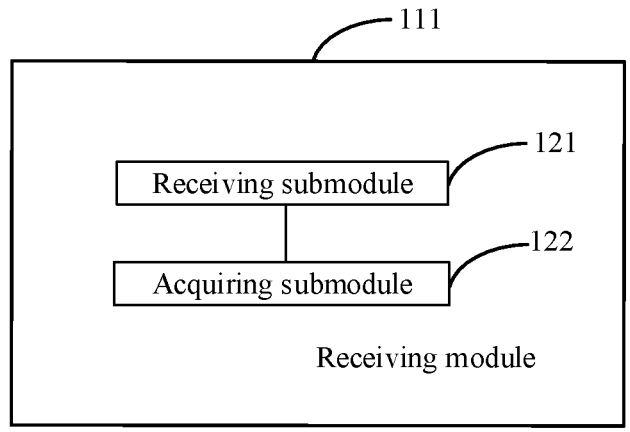
FIG. 12 is a block diagram illustrating another network detach apparatus according to an embodiment.

In an embodiment, on the basis of the apparatus shown in FIG. 11, as shown in FIG. 12, the receiving module 111 may include:
- a receiving submodule 121, configured to receive a first message for carrying the detach indication sent from the terminal; and
- an acquiring submodule 122, configured to acquire the detach indication from the first message.

In an embodiment, on the basis of the apparatus shown in FIG. 12, the first message includes at least one of a Radio Resource Control (RRC) reconfiguration complete message or a terminal assistance information message.

Figure 13:
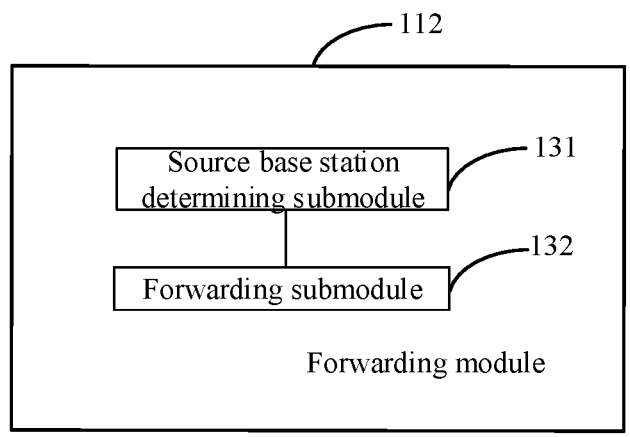
FIG. 13 is a block diagram illustrating another network detach apparatus according to an embodiment.

In an embodiment, on the basis of the apparatus shown in FIG. 11, as shown in FIG. 13, the detach indication includes a source cell identifier; and the forwarding module 112 may include:
- a source base station determining submodule 131, configured to determine the source base station corresponding to the source cell identifier; and
- a forwarding submodule 132, configured to forward the detach indication to the source base station corresponding to the source cell identifier.

It can be seen from the above embodiment that the detach indication sent from the terminal is received, the detach indication is used to instruct the terminal to detach from the source base station, and the detach indication is forwarded to the source base station. In this way, the source base station can perform network detach from the terminal based on the detach indication forwarded by the target base station, thus enriching the implementation of the detach indication, and also improving the reliability of the detach indication transmission.

Figure 14:
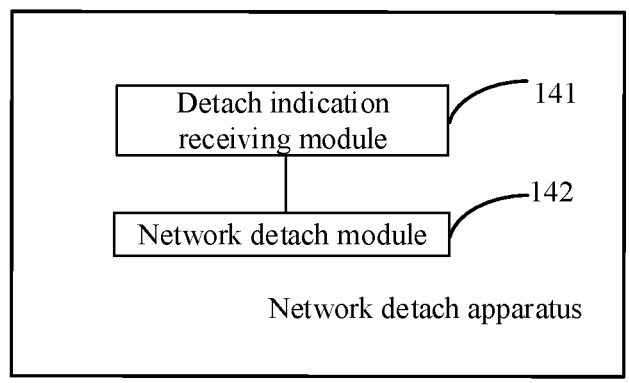
FIG. 14 is a block diagram illustrating a network detach apparatus according to an embodiment.

FIG. 14 is a block diagram illustrating a network detach apparatus according to an embodiment. The network detach apparatus may be applied to a source base station and used to perform the network detach method shown in FIG. 6. As shown in FIG. 14, the network detach apparatus can include:
- a detach indication receiving module 141, configured to receive a detach indication of a terminal forwarded by a target base station, where the detach indication is indication information set after the terminal successfully establishes a connection with the target base station and used to instruct the terminal to detach from the source base station; and
- a network detach module 142, configured to perform network detach from the terminal based on the detach indication.

Figure 15:
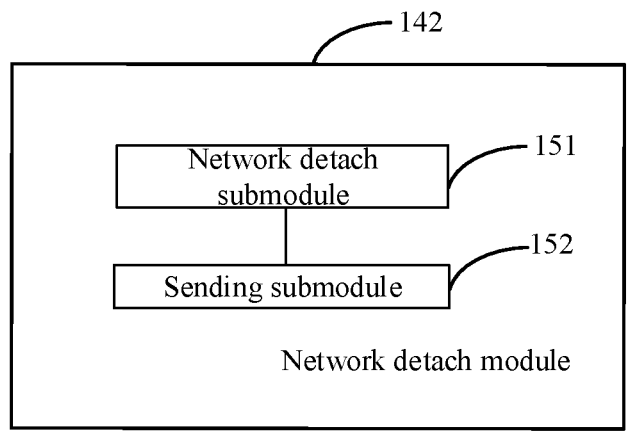
FIG. 15 is a block diagram illustrating another network detach apparatus according to an embodiment.

In an embodiment, on the basis of the apparatus shown in FIG. 14, as shown in FIG. 15, the network detach module 142 may include:
- a network detach submodule 151, configured to stop data transmission with the terminal based on the detach indication; and
- a sending submodule 152, configured to perform sequence number transfer and data forwarding to the target base station.

Figure 16:
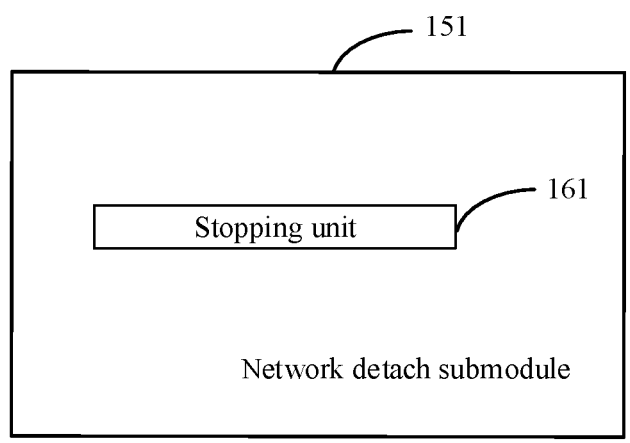
FIG. 16 is a block diagram illustrating another network detach apparatus according to an embodiment.

In an embodiment, on the basis of the apparatus shown in FIG. 15, as shown in FIG. 16, the detach indication includes a first subframe number; and the network detach submodule 151 may include:
- a stopping unit 161, configured to stop data transmission with the terminal when reaching a subframe indicated by the first subframe number.

It can be seen from the above embodiment that the detach indication of the terminal forwarded by the target base station is received. The detach indication is indication information set after the terminal successfully establishes a connection with the target base station and used to instruct the terminal to detach from the source base station. The network detach from the terminal is performed based on the detach indication forwarded by the target base station. In this way, a service interruption caused by a failure to send the detach indication from the terminal to the source base station is avoided, service interruption time of the terminal during a handover process is further shortened and the accuracy and efficiency of network detach are also improved.

For the apparatus embodiment, since the apparatus substantially corresponds to the method embodiment, reference may be made to some description of the method embodiment. The apparatus embodiments described above are merely schematic, in which the units described as separate components may or may not be physically separated, and the components displayed as units may or may not be physical units, may be located in one place, or may be distributed to a plurality of network units. Some or all of the modules may be selected according to actual needs to achieve the solution of the present disclosure, which a person of ordinary skill in the art would understand and implement without creative efforts.

The present disclosure further provides a non-transitory computer readable storage medium with computer instructions stored thereon, where the computer instructions are used to perform the network detach method shown in any one of FIG. 1 to FIG. 4.

The present disclosure further provides a non-transitory computer readable storage medium with computer instructions stored thereon, where the computer instructions are used to perform the network detach method shown in FIG. 5.

The present disclosure further provides a non-transitory computer readable storage medium with computer instructions stored thereon, where the computer instructions are used to perform the network detach method shown in FIG. 6.

The present disclosure further provides a network detach apparatus applied to a terminal, including:
a processor; and a memory for storing instructions executable by the processor,
where the processor is configured to:
determine that a connection between the terminal and a target base station is successfully established;
set a detach indication, where the detach indication is used to instruct the terminal to detach from a source base station; and
send the detach indication to the target base station, where the detach indication is forwarded by the target base station to the source base station, so that the source base station performs network detach from the terminal based on the detach indication.

Figure 17:
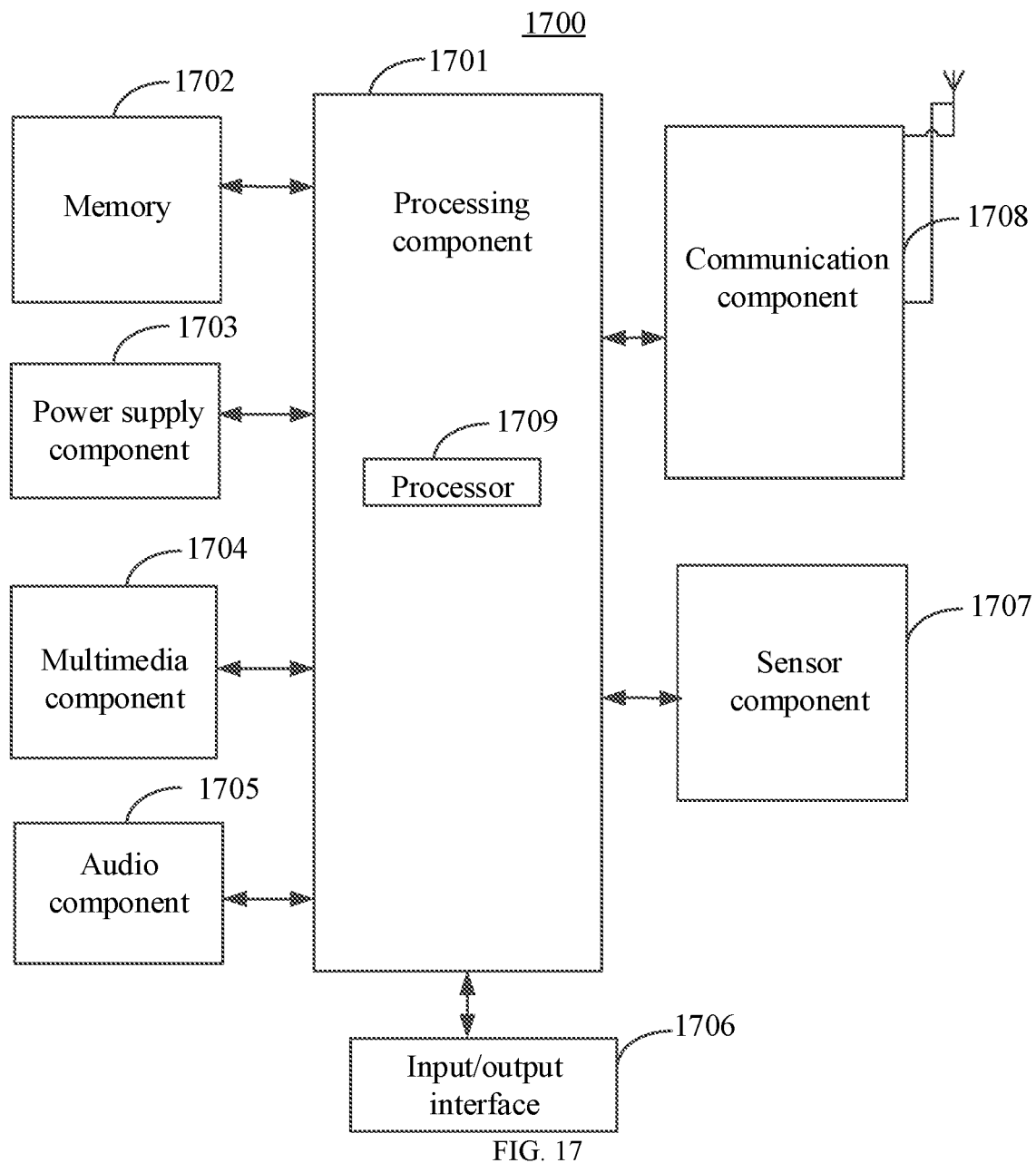
FIG. 17 is a schematic structural diagram illustrating a network detach apparatus according to an embodiment.

FIG. 17 is a schematic structural diagram illustrating a network detach apparatus according to an embodiment. As shown in FIG. 17, a network detach apparatus 1700 is shown according to an embodiment. The apparatus 1700 may be a terminal such as a computer, a mobile phone, a digital broadcast terminal, a message transceiving device, a game console, a tablet device, medical equipment, fitness equipment and a personal digital assistant.

As shown in FIG. 17, the apparatus 1700 may include one or more of the following components: a processing component 1701, a memory 1702, a power supply component 1703, a multimedia component 1704, an audio component 1705, an input/output (I/O) interface 1706, a sensor component 1707 and a communication component 1708.

The processing component 1701 generally controls overall operations of the apparatus 1700, such as operations associated with display, phone calls, data communications, camera operations, and recording operations. The processing component 1701 may include one or more processors 1709 to execute instructions so as to complete all or part of the steps of the above methods. In addition, the processing component 1701 may include one or more modules to facilitate the interaction between the processing component 1701 and other components. For example, the processing component 1701 may include a multimedia module to facilitate the interaction between the multimedia component 1704 and the processing component 1701.

The memory 1702 is configured to store various types of data to support the operation of the apparatus 1700. Examples of such data include instructions for any application or method operated on the apparatus 1700, contact data, phonebook data, messages, pictures, videos, and so on. The memory 1702 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1703 supplies power for different components of the apparatus 1700. The power supply component 1703 may include a power supply management system, one or more power supplies, and other components associated with generating, managing and distributing power for the apparatus 1700.

The multimedia component 1704 includes a screen providing an output interface between the apparatus 1700 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1704 may include a front camera and/or a rear camera. The front camera and/or rear camera may receive external multimedia data when the apparatus 1700 is in an operating mode, such as a photographing mode or a video mode. Each of the front camera and the rear camera may be a fixed optical lens system or have focal length and optical zooming capability.

The audio component 1705 is to output and/or input an audio signal. For example, the audio component 1705 includes a microphone (MIC). When the apparatus 1700 is in an operating mode, such as a call mode, a record mode and a voice recognition mode, the microphone is to receive an external audio signal. The received audio signal may be further stored in the memory 1702 or sent via the communication component 1708. In some examples, the audio component 1705 further includes a speaker for outputting an audio signal.

The I/O interface 1706 provides an interface between the processing component 1701 and a peripheral interface module. The peripheral interface module may be a keyboard, a click wheel, buttons, or the like. These buttons may include but not limited to, a home button, a volume button, a start button and a lock button.

The sensor component 1707 includes one or more sensors to provide status assessments of various aspects for the apparatus 1700. For example, the sensor component 1707 may detect the on/off status of the apparatus 1700, and relative positioning of the component, for example, the component is a display and a keypad of the apparatus 1700. The sensor component 1707 may also detect a change in position of the apparatus 1700 or a component of the apparatus 1700, a presence or absence of the contact between a user and the apparatus 1700, an orientation or an acceleration/deceleration of the apparatus 1700, and a change in temperature of the apparatus 1700. The sensor component 1707 may include a proximity sensor to detect the presence of a nearby object without any physical contact. The sensor component 1707 may further include an optical sensor, such as a Complementary Metal-Oxide-Semiconductor (CMOS) or Charged Coupled Device (CCD) image sensor which is used in imaging applications. In some examples, the sensor component 1707 may further include an acceleration sensor, a gyroscope sensor, a magnetic sensor, a pressure sensor, or a temperature sensor.

The communication component 1708 is to facilitate wired or wireless communication between the apparatus 1700 and other devices. The apparatus 1700 may access a wireless network based on a communication standard, such as Wi-Fi, 2G, 3G, or a combination thereof. In an example, the communication component 1708 receives a broadcast signal or broadcast related information from an external broadcast management system via a broadcast channel. In an example, the communication component 1708 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 1700 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above method.

In an example, there is further provided a non-transitory computer readable storage medium including instructions, such as the memory 1702 including instructions. The above instructions may be executed by the processor 1709 of the apparatus 1700 to complete the above method. For example, the non-transitory computer readable storage medium may be a Read-Only Memory (ROM), a Random Access Memory (RAM), a CD-ROM, a magnetic tape, a floppy disk, an optical data storage device, and the like.

When the instructions in the storage medium are executed by the processor, the apparatus 1700 is caused to perform any one of the above-mentioned network detach methods.

The present disclosure further provides a network detach apparatus applied to a target base station, including:
 a processor; and a memory for storing instructions executable by the processor,
 where the processor is configured to:
 receive a detach indication sent from a terminal, where the detach indication is used to instruct the terminal to detach from a source base station; and
 forward the detach indication to the source base station, so that the source base station performs network detach from the terminal based on the detach indication.

Figure 18:
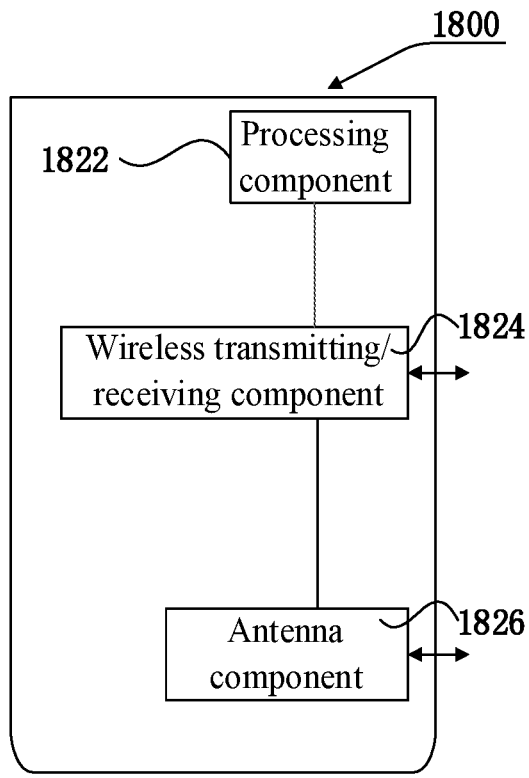
FIG. 18 is a schematic structural diagram illustrating a network detach apparatus according to an embodiment.

As shown in FIG. 18, FIG. 18 is a schematic structural diagram illustrating a network detach apparatus according to an embodiment. The apparatus 1800 may be provided as a target base station. Referring to FIG. 18, the apparatus 1800 includes a processing component 1822, a wireless transmitting/receiving component 1824, an antenna component 1826 and a signal processing portion specific to a wireless interface. The processing component 1822 may further include one or more processors.

One of the processors in the processing component 1822 may be configured to perform any one of the above-mentioned network detach methods.

The present disclosure further provides a network detach apparatus applied to a source base station, including:
 a processor; and a memory for storing instructions executable by the processor, The processor is configured to:
 receive a detach indication of a terminal forwarded by a target base station, where the detach indication is indication information set after the terminal successfully establishes a connection with the target base station and used to instruct the terminal to detach from the source base station; and
 perform network detach from the terminal based on the detach indication.

Figure 19:
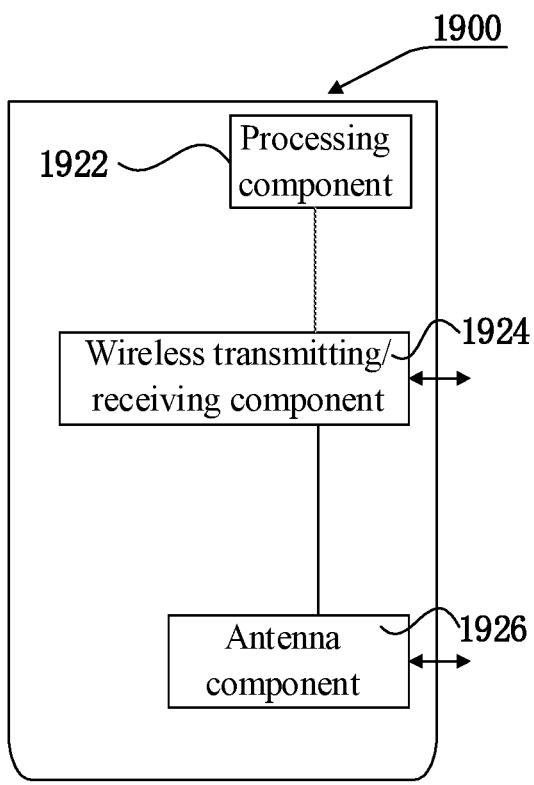
FIG. 19 is a schematic structural diagram illustrating a network detach apparatus according to an embodiment.

As shown in FIG. 19, FIG. 19 is a schematic structural diagram illustrating a network detach apparatus according to an embodiment. The apparatus 1900 may be provided as a source base station. Referring to FIG. 19, the apparatus 1900 includes a processing component 1922, a wireless transmitting/receiving component 1924, an antenna component 1926 and a signal processing portion specific to a wireless interface. The processing component 1922 may further include one or more processors.

One of the processors in the processing component 1922 may be configured to perform any one of the above-mentioned network detach methods.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Those skilled in the art will easily think of other embodiments of the present disclosure after considering the specification and practicing the disclosure disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as exemplary only.

The technical solutions provided by the embodiments of the present disclosure may include the following beneficial effects.

In the present disclosure, after determining that the connection between the terminal and the target base station is successfully established, a terminal can set a detach indication and send the detach indication to the target base station, where the detach indication is used to instruct the terminal to detach from the source base station. The detach indication is forwarded to the source base station by the target base station, so that the source base station may perform network detach from the terminal based on the detach indication. In this way, a service interruption caused by a failure to send the detach indication from the terminal to the source base station is avoided, service interruption time of the terminal during a handover process is further shortened and the accuracy and efficiency of network detach are also improved.

In the present disclosure, a target base station can receive the detach indication sent from the terminal and forward the detach indication to the source base station, where the detach indication is used to instruct the terminal to detach from the source base station. In this way, the source base station can perform network detach from the terminal based on the detach indication forwarded by the target base station, thus enriching the implementation of the detach indication, and also improving the reliability of the detach indication transmission.

In the present disclosure, a source base station can receive the detach indication of the terminal forwarded by the target base station and perform network detach from the terminal based on the detach indication forwarded by the target base station, where the detach indication is indication information set after the terminal successfully establishes a connection with the target base station and used to instruct the terminal to detach from the source base station. In this way, a service interruption caused by a failure to send the detach indication from the terminal to the source base station is avoided, service interruption time of the terminal during a handover process is further shortened and the accuracy and efficiency of network detach are also improved.

It should be understood that the present disclosure is not limited to the precise structure that has been described above and shown in the drawings, and various modifications and changes can be made without departing from its scope.

What is claimed is:

1. A network detach method, comprising:
   determining, by a terminal, that a connection between the terminal and a target base station is successfully established;
   setting a detach indication by the terminal, wherein the detach indication comprises a first subframe number and is used to instruct a source base station to stop data transmission with the terminal when reaching a subframe indicated by the first subframe number;
   sending the detach indication to the target base station by the terminal, wherein the detach indication is forwarded by the target base station to the source base station; and
   stopping data transmission with the source base station when reaching the subframe indicated by the first subframe number.

2. The method of claim 1, wherein the detach indication further comprises a source cell identifier.

3. The method of claim 1, wherein sending the detach indication to the target base station comprises:
   determining a first message for carrying the detach indication;
   adding the detach indication to the first message; and
   sending the first message to the target base station, so that the target base station acquires the detach indication from the first message.

4. The method of claim 3, wherein the first message comprises at least one of a Radio Resource Control (RRC) reconfiguration complete message or a terminal assistance information message.

5. A non-transitory computer readable storage medium with computer instructions stored thereon, wherein the computer instructions are used to perform the network detach method according to claim 1.

6. A network detach apparatus applied to a terminal, comprising:
   a processor; and
   a memory for storing instructions executable by the processor,
   wherein the processor is configured to perform the network detach method according to claim 1.

7. A network detach method, comprising:
   receiving a detach indication sent from a terminal by a target base station, wherein the detach indication comprises a first subframe number and is used to instruct a source base station to stop data transmission with the terminal when reaching a subframe indicated by the first subframe number; and
   forwarding the detach indication to the source base station by the target base station.

8. The method of claim 7, wherein receiving the detach indication sent from the terminal comprises:
   receiving a first message for carrying the detach indication sent from the terminal; and
   acquiring the detach indication from the first message.

9. The method of claim 8, wherein the first message comprises at least one of a Radio Resource Control (RRC) reconfiguration complete message or a terminal assistance information message.

10. The method of claim 7, wherein the detach indication further comprises a source cell identifier; and
    forwarding the detach indication to the source base station comprises:
       determining the source base station corresponding to the source cell identifier; and
       forwarding the detach indication to the source base station corresponding to the source cell identifier.

11. A non-transitory computer readable storage medium with computer instructions stored thereon, wherein the computer instructions are used to perform the network detach method according to claim 7.

12. A network detach apparatus applied to a target base station, comprising:
    a processor; and
    a memory for storing instructions executable by the processor,
    wherein the processor is configured to perform the network detach method according to claim 7.

13. A network detach method, comprising:
    receiving, by a source base station, a detach indication of a terminal forwarded by a target base station, wherein the detach indication is indication information set after the terminal successfully establishes a connection with the target base station and used to instruct the source base station to detach from the terminal, and the detach indication comprises a first subframe number; and
    performing network detach from the terminal based on the detach indication by the source base station;
    wherein performing network detach from the terminal based on the detach indication by the source base station comprises:
       when reaching a subframe indicated by the first subframe number, stopping data transmission with the terminal.

14. The method of claim 13, wherein performing network detach from the terminal based on the detach indication comprises:
    performing sequence number transfer and data forwarding to the target base station.

15. A non-transitory computer readable storage medium with computer instructions stored thereon, wherein the computer instructions are used to perform the network detach method according to claim 13.

16. A network detach apparatus applied to a source base station, comprising:
- a processor; and
- a memory for storing instructions executable by the processor,
- wherein the processor is configured to perform the network detach method according to claim 13.

* * * * *